United States Patent
Randall et al.

(10) Patent No.: US 8,792,781 B1
(45) Date of Patent: Jul. 29, 2014

(54) PERSONAL FLUID WARMING DEVICE AND ASSOCIATED METHODS

(75) Inventors: Mark Edward Randall, Rochester, NY (US); Christopher L. Hawker, Columbus, OH (US); Jessica A. Moreland, Columbus, OH (US); Christopher R. Trunek, Auburn Township, OH (US)

(73) Assignee: Rochester CCC Incorporated, Rochester, NY (US)

( * ) Notice: Subject to any disclaimer, the term of this patent is extended or adjusted under 35 U.S.C. 154(b) by 267 days.

(21) Appl. No.: 12/899,194

(22) Filed: Oct. 6, 2010

(51) Int. Cl.
*A47J 31/54* (2006.01)

(52) U.S. Cl.
USPC ........................................................ 392/445

(58) Field of Classification Search
USPC ......... 392/386, 387, 390, 394, 403, 405, 497, 392/444, 445; 128/203.26; 219/521, 522, 219/528, 530, 531, 533, 229, 242, 385, 430, 219/433, 439, 441; 222/146.5, 472; 220/567.3, 592.22
See application file for complete search history.

(56) References Cited

U.S. PATENT DOCUMENTS

| | | | | |
|---|---|---|---|---|
| 2,060,237 A * | 11/1936 | Muller | ........................... | 219/521 |
| 2,090,666 A * | 8/1937 | Copeland | ....................... | 219/428 |
| 2,142,599 A * | 1/1939 | Binder | ........................... | 219/400 |
| 2,413,176 A * | 12/1946 | Deaton | ........................... | 219/521 |
| 2,511,643 A * | 6/1950 | Lawrence | ....................... | 219/415 |
| 2,577,327 A * | 12/1951 | Hill | ............................... | 219/389 |
| 2,644,072 A * | 6/1953 | Aruth | ............................ | 219/521 |
| 2,713,112 A * | 7/1955 | Mills et al. | ...................... | 219/521 |
| 3,005,904 A * | 10/1961 | Thompson | ..................... | 219/220 |
| 3,152,245 A * | 10/1964 | Litman | ........................... | 219/433 |
| 3,432,641 A | 3/1966 | Welke | | |
| 3,585,362 A | 6/1971 | Hoogesteger | | |
| 3,891,827 A * | 6/1975 | Wyse | ............................. | 392/477 |
| 3,997,083 A * | 12/1976 | McNair | ........................ | 222/146.3 |
| 4,056,707 A * | 11/1977 | Farnam | ........................ | 392/466 |
| 4,069,949 A * | 1/1978 | Ryckman, Jr. | ............. | 222/146.3 |
| 4,215,843 A * | 8/1980 | Gay et al. | ........................ | 249/78 |
| 4,238,666 A | 12/1980 | Pomper | | |
| 4,320,626 A | 3/1982 | Donnelly | | |
| 4,764,660 A * | 8/1988 | Swiatosz | ........................ | 392/397 |
| 5,248,870 A * | 9/1993 | Redal | ............................. | 219/521 |
| 5,700,991 A | 12/1997 | Osbern | | |
| 6,204,485 B1 * | 3/2001 | Williams | ........................ | 219/429 |
| 6,250,505 B1 * | 6/2001 | Petit | ................................ | 222/95 |
| 6,310,329 B1 * | 10/2001 | Carter | ............................ | 219/432 |
| 6,311,868 B1 * | 11/2001 | Krietemeier et al. | ............. | 222/1 |
| 6,314,867 B1 * | 11/2001 | Russell | ........................ | 99/323.3 |

(Continued)

*Primary Examiner* — Dana Ross
*Assistant Examiner* — Frederick Calvetti
(74) *Attorney, Agent, or Firm* — Carl M. Napolitano; GrayRobinson, P.A.

(57) ABSTRACT

A temperature-regulating device for a personal fluid includes a housing having an exterior wall defining an inner space and having an opening therethrough. A dividing wall within the inner space defines a reservoir sector and a heating system sector on opposite sides. A cap portion is affixable adjacent the opening, has a closable aperture therethrough, and is movable between a storing position in covering relation to the opening and a dispensing and filling position wherein the opening is exposed, for enabling a fluid to be placed within and removed from the reservoir sector. A heating system within the heating system sector includes a heating element adjacent the dividing wall, for enabling heat transfer to the wall and then to the reservoir sector. An activator affixed adjacent the exterior wall is in signal communication with the heating system. An illumination element is provided for facilitating visualization in low-light conditions.

22 Claims, 10 Drawing Sheets

(56) References Cited

U.S. PATENT DOCUMENTS

| | | |
|---|---|---|
| 6,362,460 B1 | 3/2002 | Fraker |
| 6,367,540 B1 * | 4/2002 | Elliott .............................. 165/74 |
| 6,415,957 B1 * | 7/2002 | Michaels et al. ........... 222/146.3 |
| 6,444,956 B1 * | 9/2002 | Witcher et al. ................ 219/429 |
| 6,454,127 B1 * | 9/2002 | Suomela et al. ................ 222/54 |
| D466,755 S * | 12/2002 | Henry ............................ D7/323 |
| 6,655,552 B2 * | 12/2003 | Aiken et al. ............... 222/146.3 |
| 6,703,590 B1 | 3/2004 | Holley, Jr. |
| 6,795,645 B2 * | 9/2004 | Hygema et al. ............... 392/477 |
| 6,870,137 B1 * | 3/2005 | Clapp .......................... 219/433 |
| 6,931,202 B2 * | 8/2005 | Pedrotti et al. ................ 392/395 |
| 6,981,381 B1 * | 1/2006 | Wang et al. ...................... 62/3.2 |
| 7,015,423 B2 | 3/2006 | Friedman |
| 7,208,707 B2 * | 4/2007 | Clothier et al. ................ 219/618 |
| 2002/0017532 A1 * | 2/2002 | Aiken et al. ..................... 221/96 |
| 2003/0097041 A1 | 5/2003 | Ritchie et al. |
| 2004/0021017 A1 * | 2/2004 | Sumiyoshi et al. ........... 239/690 |
| 2004/0124988 A1 * | 7/2004 | Leonard et al. ............... 340/612 |
| 2007/0131676 A1 * | 6/2007 | Clothier et al. ............... 219/618 |
| 2007/0269251 A1 * | 11/2007 | Skalitzky et al. ................. 401/2 |
| 2009/0194550 A1 | 8/2009 | Yount |
| 2009/0261181 A1 * | 10/2009 | Cheung ........................ 239/129 |
| 2010/0001417 A1 * | 1/2010 | D'Amico ........................ 261/26 |
| 2010/0181387 A1 * | 7/2010 | Zaffaroni et al. ................ 239/13 |
| 2010/0212179 A1 * | 8/2010 | Schmid ............................ 34/283 |
| 2011/0209721 A1 * | 9/2011 | Yahnker et al. ............... 132/271 |

* cited by examiner

PERSONAL FLUID WARMING DEVICE AND ASSOCIATED METHODS

BACKGROUND OF THE INVENTION

1. Field of the Invention

The present invention relates to fluid dispensers, and, more particularly, to dispensers having a warming feature, and, most particularly, to warming dispensers for personal lubricants and other such fluids.

2. Description of Related Art

In the home situations, personal lubricants are sometimes needed to reduce friction between two surfaces and are commonly used to manage female vaginal dryness during sexual activity as well as to ease the insertion of feminine hygiene products such as tampons. These lubricants are typically stored in either the bedroom or bathroom, away from public view, and are used at room temperature. The difference in the temperature between the lubricant and body temperature may decrease the pleasure of the individuals using the personal lubricant. Further, personal lubricants are typically packaged in plastic bottles having sharp edges that can potentially cause harm to the person using them. Also, typically packaged personal lubricants are hard to find in the dark, and having to search for the personal lubricant may jeopardize the intimate moment.

Accordingly, there is a need for a portable personal lubricant heating device that does not contain sharp edges, is readily visible, has a pleasing design adapted for public viewing, can be obtained in a variety of styles, does not jeopardize an intimate moment, and can raise the temperature of a fluid to an acceptable level.

SUMMARY OF THE INVENTION

The present invention is directed to a temperature-regulating device for a personal fluid. The device comprises a housing having an exterior wall at least partially defining an inner space having an opening therethrough into the inner space. A dividing wall is positioned within the inner space for defining a reservoir sector on a first side of the dividing wall and a heating system sector on a second side of the dividing wall opposed to the first side. The exterior wall's opening leads into the reservoir sector, which is adapted for holding a fluid therein such as a personal lubricant, massage oil, or lotion.

A cap portion is affixable adjacent the housing's exterior wall opening. The cap portion has a closable aperture therethrough, and is movable between a storing position in covering relation to the opening and a dispensing and filling position wherein the opening is exposed. The dispensing and filling position is for enabling a fluid to be placed within and removed from the reservoir. Preferably the housing's exterior wall and an exterior wall of the cap portion are substantially continuous and form a substantially smooth surface.

A heating system is positioned within the heating system sector and comprises a heating element adjacent the dividing wall. The heating element is for enabling heat transfer from the heating element to the dividing wall and thence to the reservoir sector.

An activator is affixed adjacent the housing's exterior wall. The activator is in signal communication with the heating system, and is adapted for activating and deactivating the heating system.

DETAILED DESCRIPTION OF THE PREFERRED EMBODIMENTS

Figure 1:
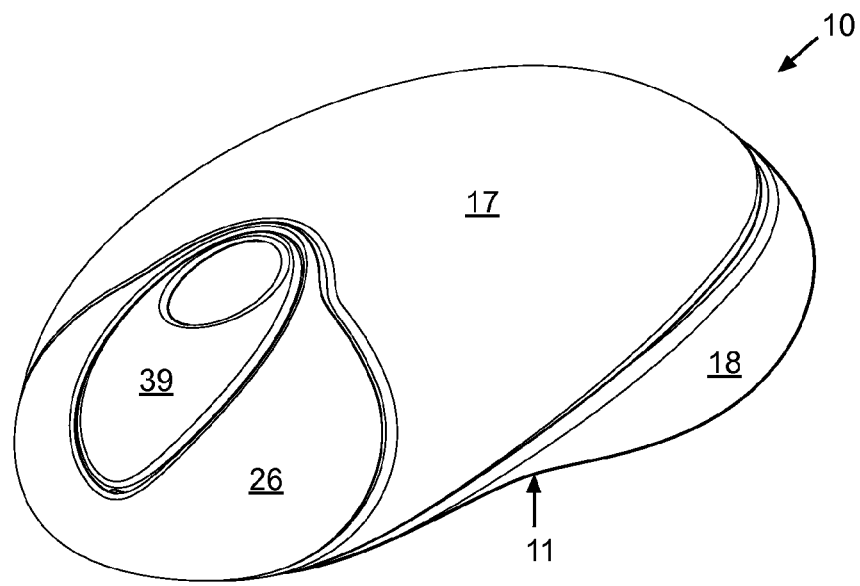
FIG. 1 is a top-side perspective view of a personal fluid heating device.
Figure 2:
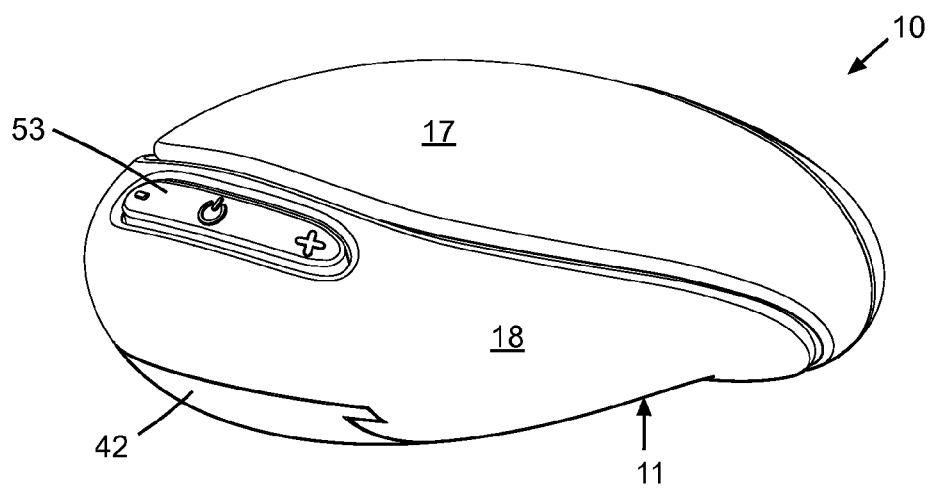
FIG. 2 is a bottom-side perspective view of the device of FIG. 1.
Figure 3:
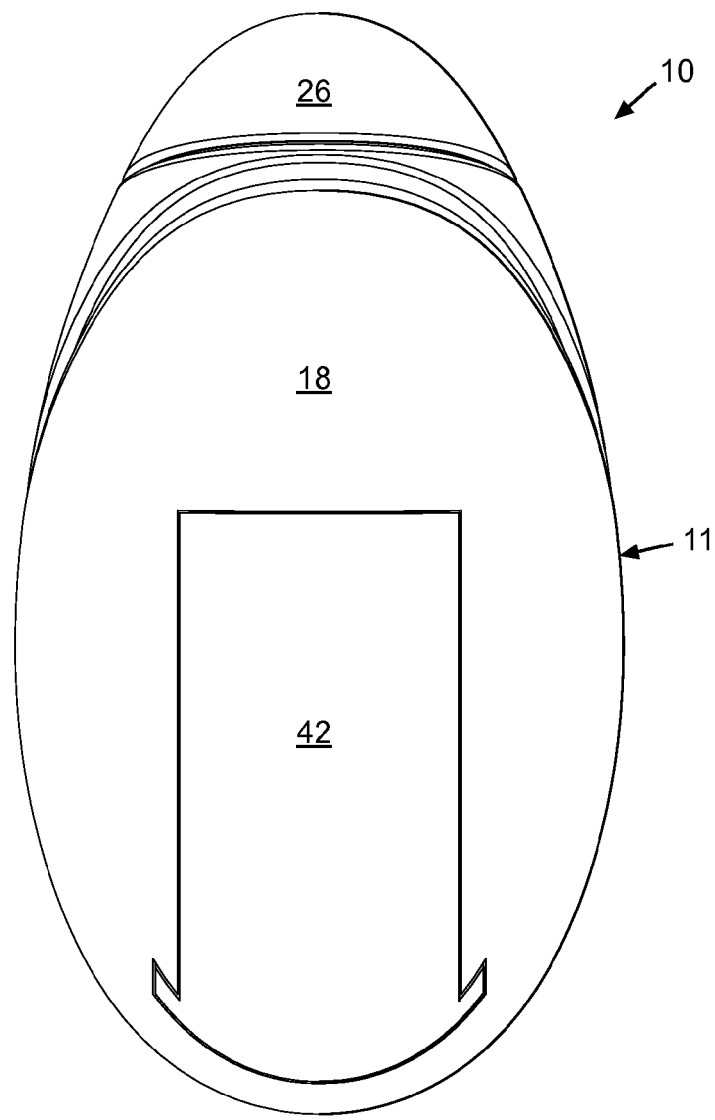
FIG. 3 is a bottom perspective view of the device of FIG. 1.
Figure 4:
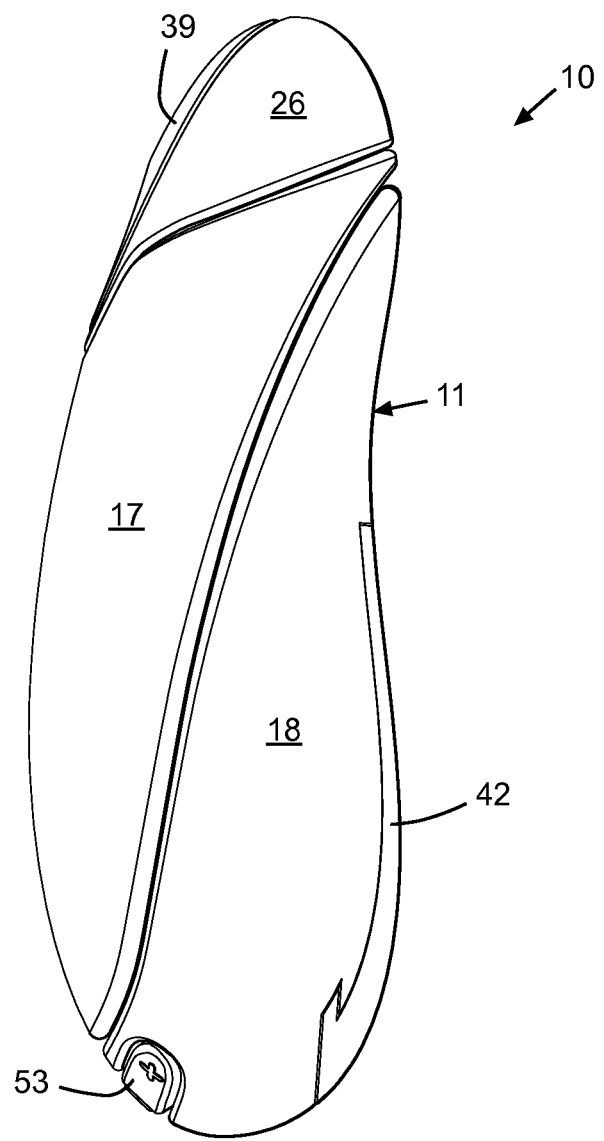
FIG. 4 is a side perspective view of the device of FIG. 1.
Figure 5:
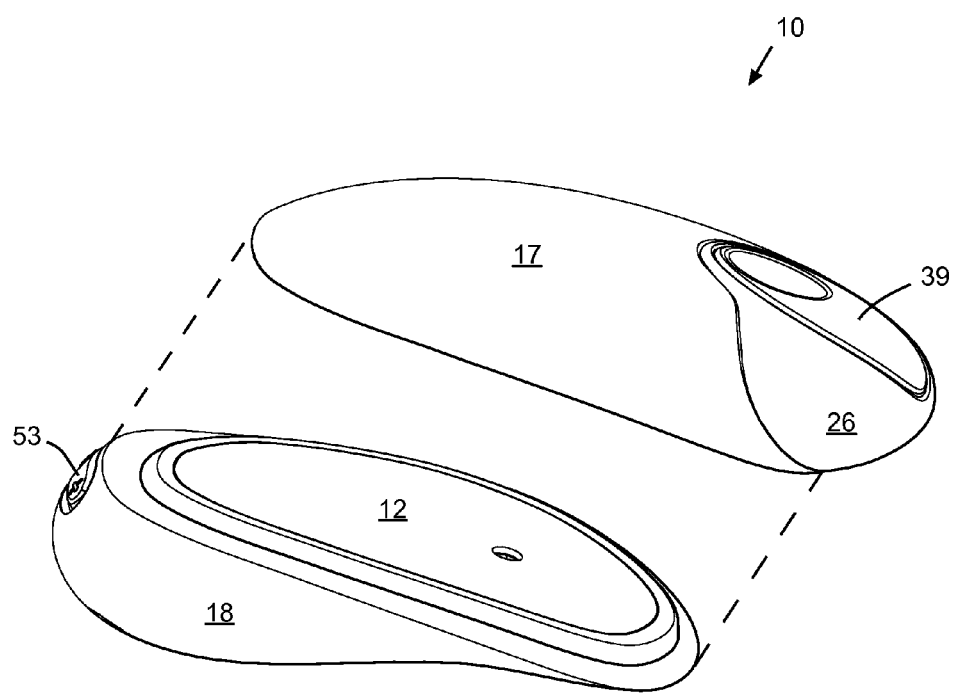
FIG. 5 is an exploded view of two separable parts of the device of FIG. 1.

A description of the preferred embodiments of the present invention will now be presented with reference to FIGS. 1-12.

The present invention is directed to a temperature-regulating device 10 for a personal fluid. One of skill in the art will appreciate that other fluids may also be subsumed under this invention, such as, but not intended to be limited to, massage oils and lotions. The device 10 comprises a housing 11 that has an exterior wall at least partially defining an inner space. Within the inner space is a dividing wall 12 as illustrated with reference to FIG. 5, that serves to define a reservoir sector 13 on a first side 14 of the dividing wall 12 and a heating system sector 15 on an opposite, second side 16 of the dividing wall 12. The dividing wall 12 preferably comprises a material adapted to facilitate heat transfer, and can comprise, although not intended as a limitation, aluminum, stainless steel, or copper.

The exterior wall comprises a plurality of elements, the totality of which define a substantially smooth exterior surface having no sharp edges or points (FIGS. 1-4). Also, preferably the exterior wall design is pleasing and sufficiently "generic" that the device 10 is amenable for public viewing. Additionally, the device 10 preferably is sized for ready portability, and, more preferably, to substantially fit in a human hand. In a particular embodiment, the exterior wall comprises two separable portions (FIG. 5): a reservoir portion 17 in surrounding relation to an outer section of the reservoir sector 13 and a heating system portion 18 in surrounding relation to the heating system sector 15 and including the dividing wall 12. With continued reference to FIG. 5 and now to FIGS. 6 and 7, one of ordinary skill in the art will appreciate that fluid stored in the reservoir sector 13 remains out of physical contact with the heating system sector 15 and will receive any heating benefits from heat transfer through the dividing wall 12. Some or all the exterior surface elements can be translucent in an embodiment to permit visualization of the contents of the reservoir sector 13 and/or of an illuminated indicator, or may be opaque to protect light-sensitive contents. Further, the reservoir portion 17 in an embodiment can be rigid or flexible for permitting contents thereof to be expelled by squeezing.

In an embodiment, the separability of the reservoir portion 17 from the heating system portion 18 permits the use and marketing of different types of fluids already contained in the reservoir sector 13, for enabling the user to quickly and easily change the fluid type desired to be dispensed.

The shape of the reservoir portion 17 in particular has been designed in an embodiment to optimize surface area in contact with the dividing wall 12, for enhancing the efficiency of heat transfer therebetween.

Figure 6:
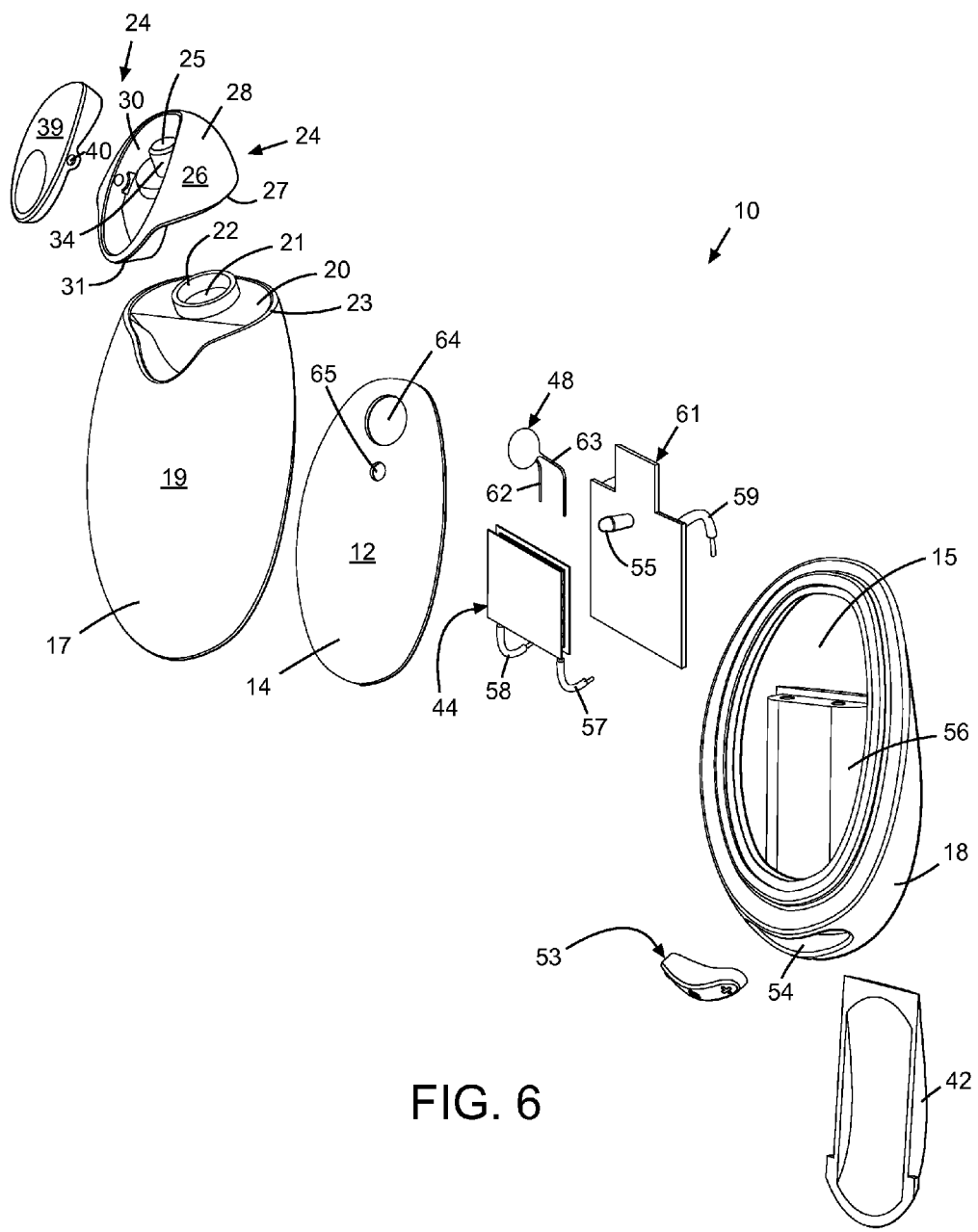
FIG. 6 is an exploded front view of the elements of the device of FIG. 1.
Figure 7:
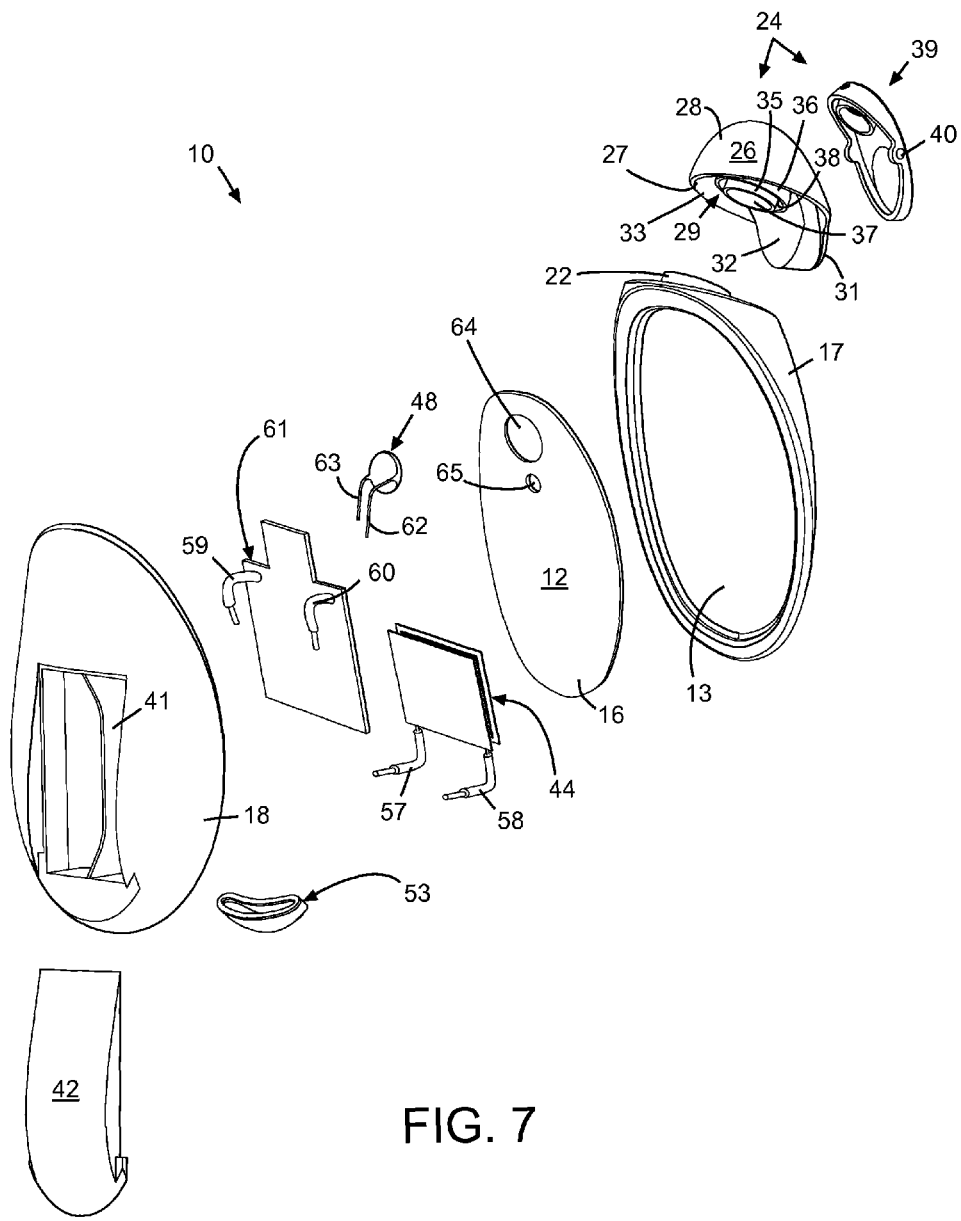
FIG. 7 is an exploded rear view of the elements of the device of FIG. 1.

Referring to the exploded views of FIGS. 6 and 7, the housing's exterior wall has a substantially ovoid bottom portion 19 and a substantially planar top portion 20. The top portion 20 has an opening 21 therethrough in fluid communication with the reservoir sector 13. The top portion 20 comprises a substantially cylindrical upwardly directed channel 22 that surrounds the opening 21. The bottom 19 and the top 20 portions meet at a circumferential edge 23.

A cap portion 24 is affixable adjacent the housing's exterior wall opening 21 and has a closable aperture 25 therethrough. The cap portion 24 comprises a cap body 26 that has an open bottom 27 and an arcuate top wall 28 that partially define an interior space 29. The top wall 28 has an opening 30 therethrough that in an embodiment is substantially oval-shaped. A bottom edge 31 of the top wall 28 is smoothly matable with the circumferential edge 23.

The cap body 26 further comprises a channel support 32 that is positioned within the interior space 29. The channel support 32 joins, and in some embodiments is integral with, an interior face 33 of the top wall 28. The channel support 32 comprises an upwardly extending, substantially cylindrical channel 34 that is positioned and adapted for mating with the housing's channel 22. In a particular embodiment, the channel support 32 further comprises a pair of downwardly extending, substantially concentric cylindrical channels 35,36. An inner channel 35 defines an opening 37 that is in fluid communication with the upwardly extending channel 34. The downwardly extending channels 35,36 have a radial space 38 therebetween that is adapted for admitting the housing's channel 22 thereinto, for improving a seal therebetween when mated.

A cap top 39 is swivelably 40 affixed to the cap body's top wall 28 in covering relation to the top wall's opening 30 and is movable between a storing position in covering relation to the opening 30 and a filling and dispensing position wherein the opening 30 is exposed. Preferably, the cap top 39 is easily openable, for example, by pressing on one side thereof. The filling and dispensing position is for enabling a fluid to be placed within and removed from the reservoir sector 13, which can be accomplished by the user him/herself if desired. Alternatively, the entire cap 26 could be removed to facilitate filling the reservoir sector 13.

The housing's exterior wall heating system portion 18 also has an opening 41 therethrough leading into the heating system sector 15. A cover 42 is positionable in covering relation to this opening 41, and is matable with the heating system portion 18 to form a substantially smooth and continuous surface. The cover 42 is removable for accessing a heating system, which will be discussed in the following.

The heating system is positioned within the heating system sector 15. The heating system comprises a heating element 44 that is adjacent the dividing wall 12. Preferably the dividing wall 12 comprises a material adapted for heat transfer, and the heating element 44 is preferably positioned for enabling heat transfer from the heating element 44 to the dividing wall 12 and thence to the reservoir sector 13. In an embodiment the heating element 44 can have a plate-like shape, although this is not intended as a limitation. The heating element 44 can comprise a thermoelectric element or a resistive element, and the device 10 can further comprise a heat sink 45 that is thermally connectable to the heating element 44. Further, in a particular embodiment, the thermoelectric element can comprises a pair of Peltier-type solid state modules.

Figure 8:
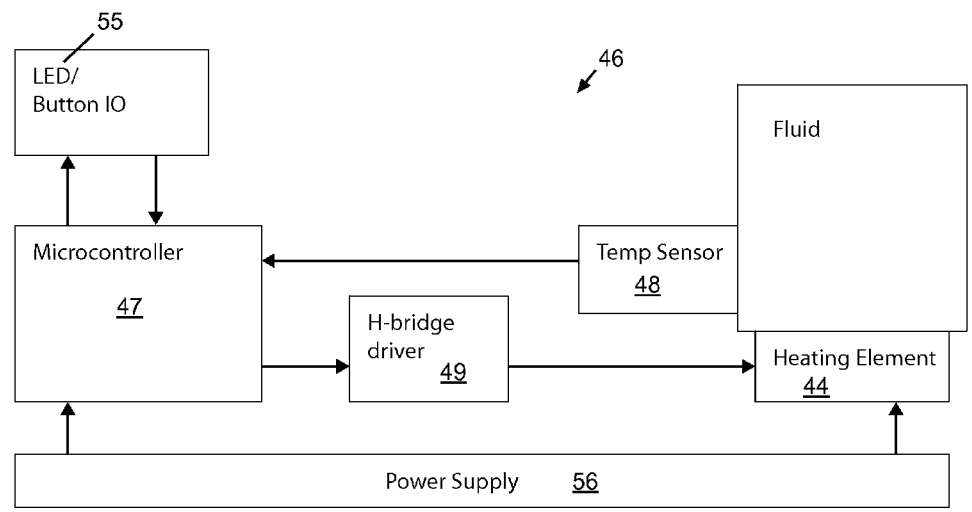
FIG. 8 is a block diagram of the heating system for the device of FIG. 1 for an embodiment having temperature control.
Figure 9:
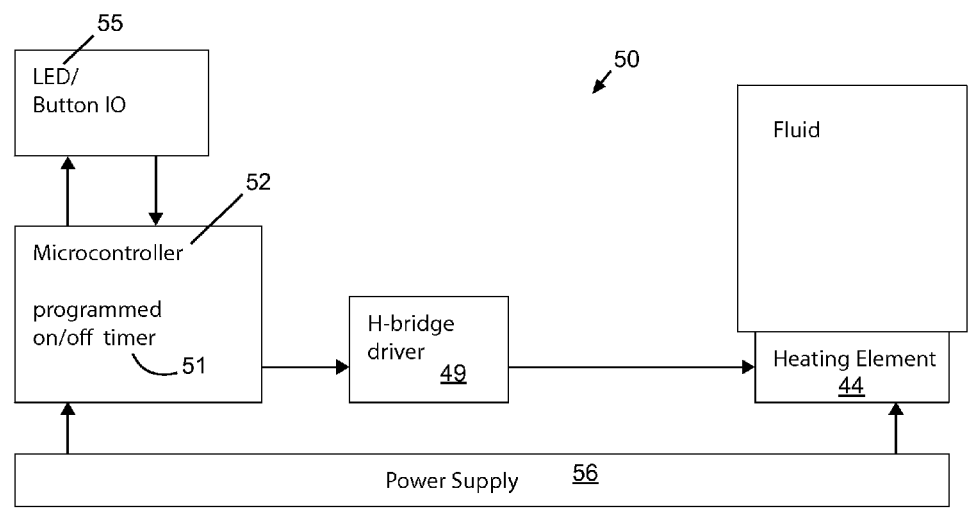
FIG. 9 is a block diagram of the heating system for the device of FIG. 1 for an embodiment having timed controllability.
Figure 10:
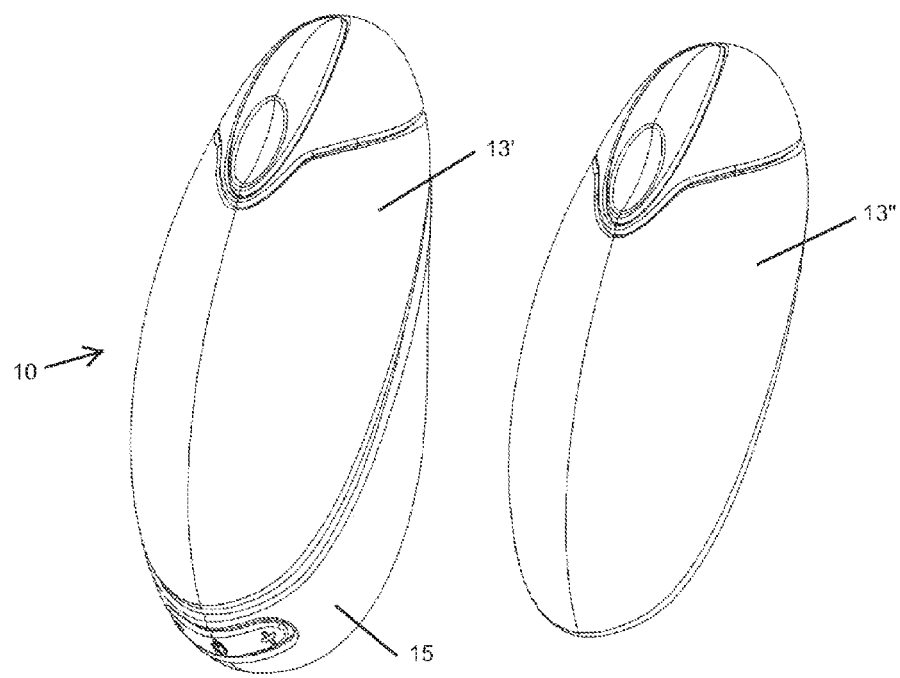
FIG. 10 is a top side perspective view of a personal fluid heating device with a first reservoir connected to the heating system sector and a second interchangeable reservoir disengaged.
Figure 11:
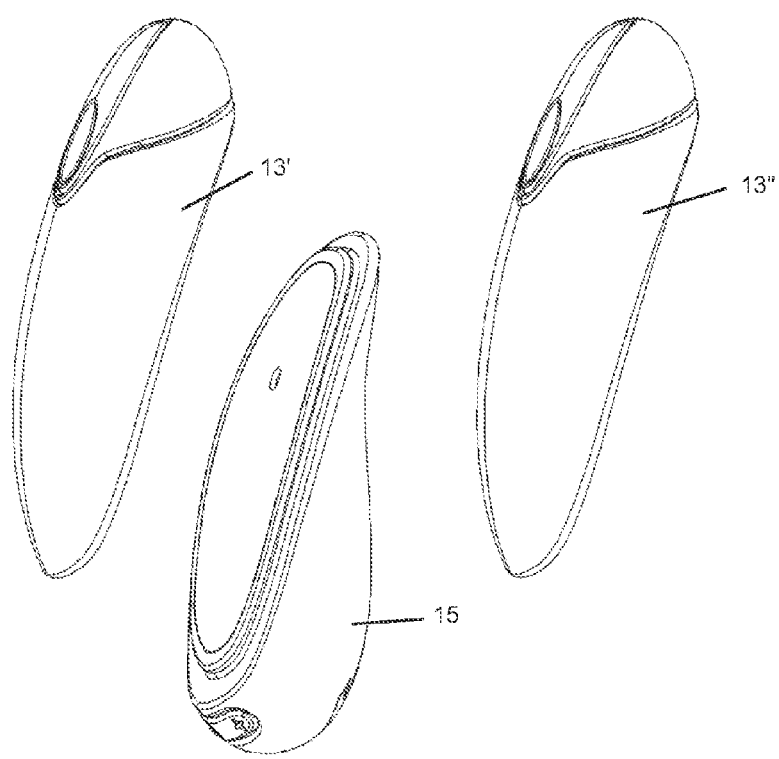
FIG. 11 is a top side perspective view of the personal fluid heating device of FIG. 10 with a first reservoir and a second reservoir both disengaged form the heating system sector
Figure 12:
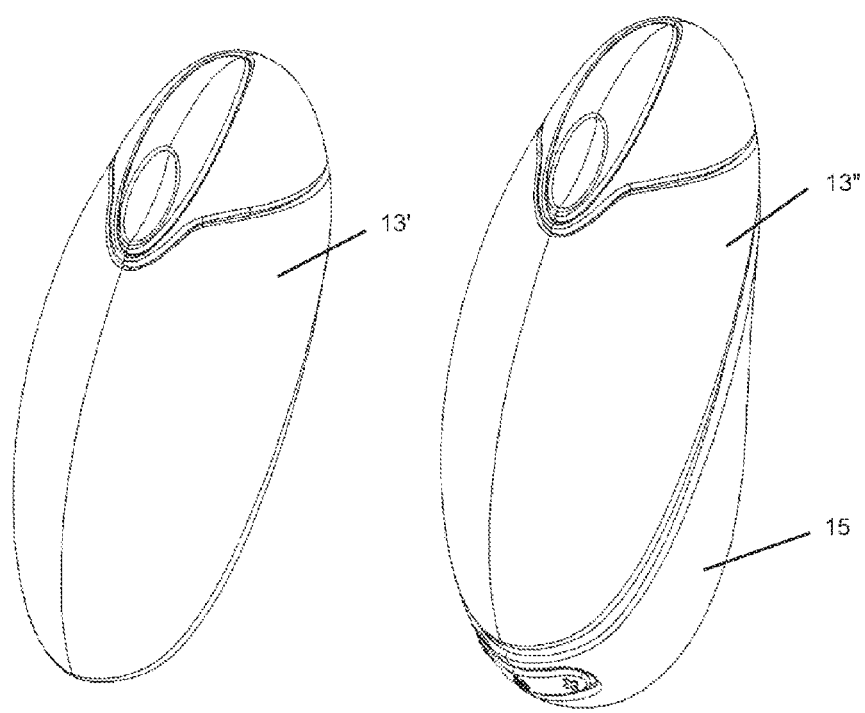
FIG. 12 is top side perspective view of the personal fluid heating device of FIG. 10 with the second reservoir connected with the heating system sector and the first reservoir disengaged.

The heating system in an embodiment further comprises a control system 46 that is in signal communication with the heating element 44, and is adapted for controlling the heating element 44 (FIGS. 8 and 9). The control system 46 in an embodiment (FIG. 8) comprises a processor 47, which can comprise a microprocessor, and a temperature sensor 48 that is in signal communication with the processor 47 and in thermal communication with the reservoir sector 13. The temperature sensor 48 may be affixed, for example, adjacent the heating element 44 and have connectors 62,63 leading to the processor 47. The temperature sensor 48 may further protrude into the reservoir sector 13 via a first hole 64 in the dividing wall 12.

The processor 47 is coded for receiving a signal representative of a current temperature of the reservoir sector 13 from the temperature sensor 48 and for controlling the heating element 44 to maintain a predetermined desired temperature. An H-bridge driver 49 may be positioned to receive a signal from the processor 47 and thence to provide a control signal to the heating element 44.

In an alternate embodiment, the processor 47 may be coded to receive a signal representative of a current temperature of the reservoir sector 13 from the temperature sensor 48 and to turn off the heating element 44 once the predetermined desired temperature is reached.

In a further embodiment (FIG. 9), the control system 50 can comprise a timer 51 that is in signal communication with the processor 52 and is settable to a predetermined length of time. In this embodiment, the processor 52 is further coded for controlling a duration of an activation of the heating element 44 to substantially the predetermined time length.

An activator 53 such as an "on/off" switch is affixed in an opening 54 in the housing's exterior wall heating system portion 18 leading into the heating system sector 15. The activator 54 may comprise, for example, a rocker-type switch, although this is not intended as a limitation. The activator 54 is in signal communication with the processor 47,52, a signal from which is adapted to cause the processor 47,52 to activate or deactivate the heating element 44.

Returning to FIGS. 6 and 7, the heating device 10 can also comprise in a visual indicator of device state that is in signal communication with the processor 47,52. For example, in an embodiment a source of illumination such as an LED 55 can be used to indicate when a predetermined temperature is reached in the reservoir sector 13, or when a predetermined time has passed, or that the device 10 has been turned on. The LED 55 can comprise a single wavelength or multiple wavelengths for indicating different system status, or can illuminate intermittently with a blinking frequency related to a parameter of the device, for example, temperature. As an example, a blinking frequency could be timed to increase as the reservoir sector temperature increases, and then the LED 55 could remain steadily illuminated upon the predetermined temperature's being reached. The LED 55 can be mounted on a plate 61, and positioned for protruding through a second hole 65 in the dividing wall 12, for example, One of skill in the art will appreciate that other indicators may be envisaged, such as, but are not intended to be limited to, sound or mechanical means such as vibration.

In an alternate embodiment, the heating system can further comprise means for cooling the reservoir sector 13 in order to provide the option of cooling a substance as well as heating. Such cooling means comprise, in a particular embodiment, the pair of peltier-type solid state modules of the thermoelectric heating element 44.

Additionally, the device 10 can draw power in any number of ways as will be appreciated by one of skill in the art. In an embodiment, a power supply 56 can include a source of AC or DC power and the appropriate converter or rectifier as needed, such as a battery that is changeable or rechargeable via the opening 41. Power can be provided via connectors 57,58 from the heating element 44, and via connectors 59,60 from the LED 55.

Having now described the invention, the construction, the operation and use of preferred embodiments thereof, and the advantageous new and useful results obtained thereby, the new and useful constructions, and reasonable equivalents thereof obvious to those skilled in the art, are set forth in the appended claims.

What is claimed is:

1. A temperature-regulating and dispensing device for a personal fluid comprising:
   a housing having:
      an exterior wall at least partially defining an inner space and having an exterior wall opening therethrough into the inner space; and
      a dividing wall within the inner space for defining a reservoir sector on a first side of the dividing wall and a heating system sector on a second side of the dividing wall opposed to the first side, wherein the personal fluid is stored only within the reservoir sector and out of direct contact with the heating system sector, the exterior wall opening leading into the reservoir sector, wherein the exterior wall comprises a reservoir portion surrounding the reservoir sector and a heating system portion surrounding the heating system sector and including the dividing wall,
      wherein the exterior wall surrounding the heating system sector forms a bottom surface of the device and the exterior wall surrounding the reservoir sector forms a top portion of the device, and wherein the dividing wall is in communication with the bottom portion of the reservoir sector, and
      wherein the exterior wall opening is at a gravitationally lower position relative to the distal portion of the reservoir, and the dividing wall slopes at an angle upwardly from the portion of the reservoir adjacent to the housing wall exterior opening toward the distal end of the reservoir so as to facilitate gravitational flow and pooling of liquid in the reservoir at the exterior opening when the bottom surface is supported on a generally horizontal support surface;
   a cap portion affixable adjacent the exterior wall opening and having a closable aperture therethrough, the cap portion movable between a storing position in covering relation to the opening and a dispensing and filling position wherein the opening is exposed, for enabling the fluid to be placed within and removed from the reservoir sector; wherein the housing exterior wall and an exterior wall of the cap portion are substantially continuous and form a substantially smooth surface;
   a heating system positioned within the heating system sector comprising a heating element adjacent the dividing wall; and
   an activator affixed adjacent the housing exterior wall in signal communication with the heating system, adapted for activating and deactivating the heating system, wherein the dividing wall is comprised of conductive materials positioned in the dividing wall in a manner sufficient for enabling heat transfer from the heating element to and through the dividing wall substantially throughout the extent of the reservoir sector to provide uniform heating of the fluid carried within the reservoir sector.

2. The device recited in claim 1, wherein the housing exterior wall has a substantially ovoid bottom portion and a substantially planar top portion containing the opening and comprising a substantially cylindrical upwardly directed channel surrounding the opening, the bottom and the top portions meeting at a circumferential edge to form a uniform exterior surface without edges; and
   the cap portion comprises:
      a cap body having an open bottom and an arcuate top wall partially defining an interior space, the top wall having an opening therethrough, a bottom edge of the top wall smoothly matable with the circumferential edge, the cap body further comprising a channel support positioned within the interior space and joining an interior face of the top wall, the channel support comprising an upwardly extending, substantially cylindrical channel positioned and adapted for mating with the housing channel; and
      a cap top affixed to the cap body top wall in covering relation to the cap body top wall opening and movable between the storing position and the dispensing and filling position.

3. The device recited in claim 2, wherein the cap top is rotationally affixed to the cap body top wall.

4. The device recited in claim 2, wherein the cap body channel support further comprises a pair of downwardly extending, substantially concentric cylindrical channels, an inner channel defining an opening in fluid communication with the upwardly extending channel, and the downwardly extending channels having a radial space therebetween adapted for admitting the housing channel thereinto, for improving a seal therebetween when mated.

5. The device recited in claim 1, wherein the heating system further comprises a control system in signal communication with the activator and with the heating element, and adapted for controlling the heating element, wherein the control system comprises a processor and a temperature sensor in signal communication with the processor and in thermal communication with the reservoir sector, the processor coded for receiving a signal representative of a current temperature from the temperature sensor and for controlling the heating element to maintain a predetermined desired temperature.

6. The device recited in claim 5, wherein the heating system further comprises an H-bridge driver in signal communication with the processor and the heating element, adapted for mediating a control signal therebetween.

7. The device recited in claim 5 further comprising a lighting element in signal communication with the processor and at least partially positioned within the heating system sector, the processor further coded for controlling an illumination of the lighting element for reflecting a state of the reservoir sector temperature, wherein the control system provides staged signal communication comprising differentiated signals to indicate heating states, such heating states selected from a group of heating activated state, interim heating state and fully heated state.

8. The device recited in claim 5, wherein the control system further comprises a timer in signal communication with the processor and settable to a predetermined length of time, the processor further coded for controlling a duration of an activation of the heating element to substantially the predetermined time length.

9. The device recited in claim 1 wherein the heating element comprises at least one of a thermoelectric element and a resistive element, and further comprising a heat sink thermally connectable to the heating element.

10. The device recited in claim 9, wherein the thermoelectric element comprises a pair of Peltier-type solid state modules.

11. The device recited in claim 1, further comprising a power source positioned within the heating system sector and configured for providing power to the heating system.

12. The device recited in claim 1, wherein the reservoir portion and the heating system portion are configured to join and be contained in a unitary enclosure within the housing, and the reservoir portion and the heating system are separable, for permitting interchangeability of a first and a second reservoir having different contents within the respective reservoir sectors.

13. The device recited in claim 1, wherein the reservoir sector is deformable to force liquid down the dividing wall and channel through the external opening for dispensing.

14. The device recited in claim 1, wherein the heating element comprises at least one of a thermoelectric element and a resistive element, and further comprising a heat sink thermally connectable to the heating element wherein the heat sink is in substantially planar communication with the extent of the reservoir.

15. The device recited in claim 1, wherein the exterior wall of the housing comprises conductive materials and is configured to be heated by heat transfer from the heated liquid in the reservoir.

16. A method for regulating a temperature of and dispensing a personal fluid comprising:
   providing a temperature-regulating device having a heating element, the device comprising:
      an exterior wall at least partially defining an inner space and having an exterior wall opening therethrough into the inner space; and
      a dividing wall within the inner space for defining a reservoir sector on a first side of the dividing wall for containing the personal fluid and a heating system sector on a second side of the dividing wall opposed to the first side for containing the heating element, wherein the personal fluid is stored only in the reservoir sector and maintained out of direct contact with the heating system sector, the exterior wall opening leading into the reservoir sector, wherein the exterior wall comprises a reservoir portion surrounding the reservoir sector and a heating system portion surrounding the heating system sector and including the dividing wall, and wherein the exterior wall surrounding the heating system sector forms a bottom surface of the device and the exterior wall surrounding the reservoir sector forms a top portion of the device, wherein the dividing wall extends in communication with the bottom portion of the reservoir, the reservoir being positioned in an upper portion of the device extending above the extent of the dividing wall and the heating system sector being positioned below the dividing wall, thus maintaining the personal fluid within the reservoir sector and out of the direct contact with the heating system sector, and wherein the housing wall exterior opening is at a lower position relative to the distal portion of the reservoir, and the dividing wall slopes at an angle upwardly from the portion of the reservoir adjacent to the housing wall exterior opening toward the distal end of the reservoir so as to facilitate flow and pooling of liquid in the reservoir at the exterior opening when the bottom portion is supported by a generally horizontal support surface, and the dividing wall is comprised of conductive material positioned in the dividing wall in a manner sufficient for enabling heat transfer from the heating element to and through the dividing wall substantially throughout the extent of to the reservoir sector to provide uniform heating of the fluid in the reservoir permitting the personal fluid to reach a desired temperature;
   maintaining the personal fluid only within the reservoir sector during a heating thereof by the heating element;
   activating the heating element for transferring heat to the personal fluid stored only in the reservoir sector and heating the personal fluid to the desired temperature;
   exposing the opening into the housing for accessing the reservoir sector; and
   dispensing at least some of the personal fluid directly from the reservoir sector at the desired temperature.

17. The method recited in claim 16, wherein the heating element is under processor control, and further comprising setting the desired temperature in the processor and using the processor to control the heating element to reach the desired temperature.

18. The method recited in claim 17, further comprising using the processor to maintain the personal fluid at the desired temperature.

19. The method recited in claim 17, further comprising illuminating a lighting element under control of the processor for reflecting a state of the reservoir sector temperature.

20. The method recited in claim 17, further comprising setting a timer under control of the processor to a predetermined length of time, for controlling a duration of an activation of the heating element to substantially the predetermined time length.

21. The method recited in claim 16, further comprising interchanging the reservoir sector with a second reservoir sector containing a second personal fluid in a reservoir sector thereof.

22. The method recited in claim 16, wherein the dispensing comprises at least one of pouring the personal fluid out of the reservoir sector and squeezing the reservoir sector to expel the personal fluid.

* * * * *